J. & B. DIVICO.
NUT LOCKING DEVICE.
APPLICATION FILED AUG. 27, 1913.

1,183,355.                                              Patented May 16, 1916.

Witnesses
F. Wm Ernst
L. A. Roane

Inventors
JOHN DIVICO
BENJAMIN DIVICO
By Joseph J. O'Brien
Attorneys

UNITED STATES PATENT OFFICE.

JOHN DIVICO AND BENJAMIN DIVICO, OF WELLSVILLE, OHIO.

NUT-LOCKING DEVICE.

1,183,355.   Specification of Letters Patent.   Patented May 16, 1916.

Application filed August 27, 1913. Serial No. 786,952.

*To all whom it may concern:*

Be it known that we, JOHN DIVICO and BENJAMIN DIVICO, naturalized citizens of the United States, residing at Wellsville, in the county of Columbiana and State of Ohio, have invented certain new and useful Improvements in Nut-Locking Devices, of which the following is a specification.

This invention relates to improvements in nut locking devices, and especially of that type adapted to be applied to fish plates for holding the nuts against turning on the threaded ends of the securing bolts.

One of the leading objects of the invention is the provision of a nut locking device which can be easily and quickly applied to the fish plate securing bolts and nuts, and which is held in place at one end by the fish plate against which the device bears and at the other end by tongues engaging one of the nuts.

Another object of the invention is the provision of a nut locking plate or bar which can be easily secured at one end under the fish plate and at the other end by bendable tongues adapted to bear against the side faces of one of the nuts, and which plate has elongated slots to receive the threaded ends of the bolts and the nuts thereon, which are adapted to permit of considerable variations in the location of the bolts and nuts, the locking plate or bar being formed out of spring metal and adapted to spring away from the fish plate so as to engage the nuts intermediate of their front and back faces.

With the above and other objects in view the invention comprises certain new and useful combinations of parts and constructions, clearly described in the following specification and clearly illustrated in the accompanying drawings, in which:—

Figure 1:
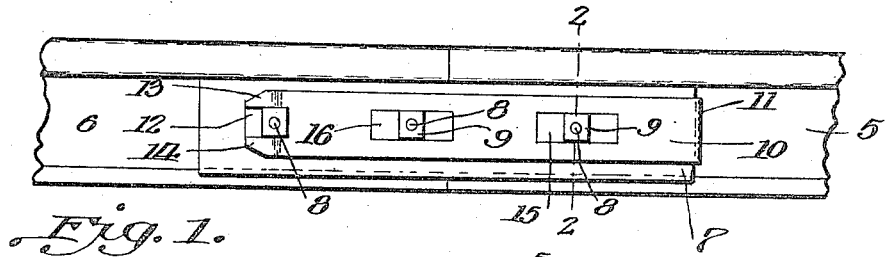
Figure 2:
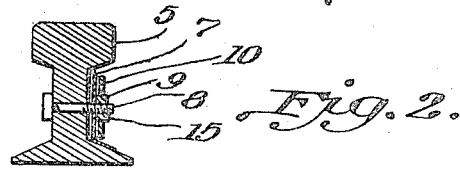
Figure 3:
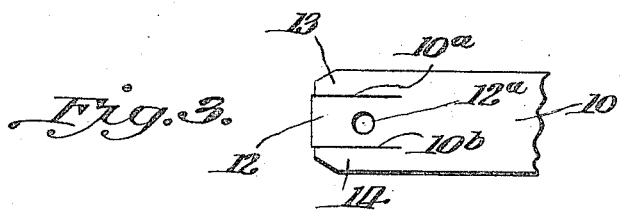
Figure 4:
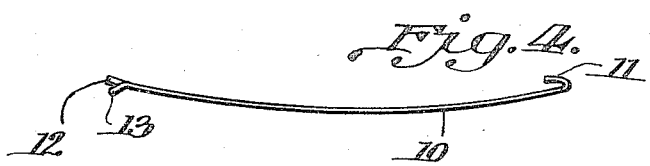
Figure 5:
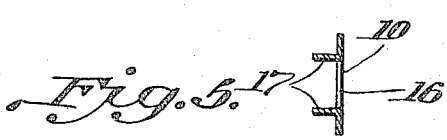
Figure 6:
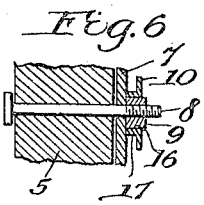

Figure 1 is a side elevation of the meeting ends of a pair of rails, showing the improved nut locking plate applied in locking position against the side of the fish plate and with the slots thereof receiving the threaded ends of the securing bolts and the nuts thereon. Fig. 2 is a transverse sectional view, taken on line 2—2 of Fig. 1. Fig. 3 is a detail end view showing the tongues on the locking plate, which are adapted to engage the sides of one of the nuts. Fig. 4 is an edge view of the improved locking plate, showing the spring bow of the same, whereby the marginal portions of the nut receiving slots will be held away from the face of the fish plate so that said marginal portions will engage the nuts intermediate of their front and back faces. Fig. 5 is a detail sectional view showing a slightly modified form of the invention. Fig. 6 is a detail transverse sectional view thereof, showing the position of the spacing lugs.

Referring to the accompanying drawings illustrating the preferred embodiment of the invention, 5 designates one of the meeting ends of the rails and 6 the other meeting end, which are placed in abutting relation. The usual fish plate 7 is placed against the webs of the rail ends 5 and 6 to bridge the joint between the two ends, and the usual bolts 8 are extended through the rail ends and the fish plate and held secured by means of the usual nuts 9.

The bolts 8, and consequently the nuts 9, are arranged in longitudinal alinement. Against the side of the fish plate 7 the nut locking plate 10 is disposed. The plate 10 is formed on one end with a hook 11, which hook is adapted to fit under the fish plate, the central portion of which is slightly spaced from the rail webs to permit of this. The opposite end of the locking plate is formed with a pair of spaced slits $10^a$ and $10^b$, arranged parallel with each other and providing a central tongue 12 and side tongues 13 and 14. The central tongue 12 is formed with a bolt opening $12^a$, which is adapted to receive the end of the bolt adjacent to which said slitted end is placed. Longitudinally extending slots 15 and 16 are formed in the locking plate 10 to receive the threaded ends of the bolts and the nuts, and said slots are formed considerably longer than the greatest diameter or the facial width of the nuts, so that the slots will be adapted to fit over the nuts on various fish plates, even though their location varies. The locking plate is formed with a slight spring bow, so that the edges of the slots will engage the nuts intermediate of their front and back faces, thus preventing an imperfect engagement.

In order to reduce the cutting qualities of the edges of the slots and to increase the bearing surface of the locking plate upon the nuts, and to effectively space the central portion of the locking plate from the fish plate, whereby locking plate will be prevented from getting too close to the inner faces of the nuts and exerting a lifting action, under the different vibrations and stresses of the rails, the locking plate 10 is provided with longitudinal flanges or wings 17, which project inwardly and are adapted to engage the nuts. The flanges or wings 17 are formed out of the material which was displaced when the slots were cut.

When it is desired to place the locking plate in locking position the hook is forced under one end of the fish plate and the slots are brought into registering positions with the ends of the bolts and with the nuts and the plate is pressed or forced toward the fish plate so that the bolt ends and nuts thereon will enter the slots. The bolt opening 12ª is forced on the nearest bolt end and the nut therefor is threaded home. When this has been accomplished the tongues 13 and 14 are bent outwardly so as to engage the sides of the nut which bear against the tongue 12. When it is desired to unlock the plate 10 and remove the same from the fish plate the reverse operation is performed.

Having described our invention we desire to secure by Letters Patent:—

A nut locking device consisting of a plate formed out of resilient material and provided on one end with a hook adapted to fit between one end of the fish plate and the opposing side face of the rail and provided on the opposite end with a bolt opening and longitudinally extending lugs on opposite sides of the bolt opening and adapted to be deflected outwardly to engage the sides of a nut threaded on the bolt projecting through the opening, the portion of the plate between the end hook and said lugs being bowed to spring outwardly of the plate and being provided with rectangular openings adapted to receive nuts located between the ends of the plate on the bolts of the fish plate, said plate being also provided with spaced opposing lugs located at the marginal portions of said last openings and adapted to engage the side faces of the nuts.

In testimony whereof we affix our signatures in presence of two witnesses.

JOHN DIVICO.
BENJAMIN DIVICO.

Witnesses:
A. NOBLE,
JOHN DUNLOP.

Copies of this patent may be obtained for five cents each, by addressing the "Commissioner of Patents, Washington, D. C."